United States Patent
Schlenker et al.

(10) Patent No.: US 11,193,246 B2
(45) Date of Patent: Dec. 7, 2021

(54) CONSTRUCTION MACHINE RIDE CONTROL SYSTEMS AND METHODS USING ELEVATION CYLINDER CONTROL

(71) Applicant: Caterpillar Paving Products Inc., Brooklyn Park, MN (US)

(72) Inventors: Brian J. Schlenker, Shoreview, MN (US); Jason W. Muir, Andover, MN (US); Derek P. Nieuwsma, Loretto, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 244 days.

(21) Appl. No.: 16/276,270

(22) Filed: Feb. 14, 2019

(65) Prior Publication Data

US 2020/0263366 A1 Aug. 20, 2020

(51) Int. Cl.
| | | |
|---|---|---|
| E01C 23/088 | (2006.01) | |
| G05D 1/08 | (2006.01) | |
| B60G 3/01 | (2006.01) | |
| B60G 17/0165 | (2006.01) | |

(52) U.S. Cl.
CPC .............. *E01C 23/088* (2013.01); *B60G 3/01* (2013.01); *B60G 17/0165* (2013.01); *G05D 1/0891* (2013.01); *B60G 2300/09* (2013.01); *G05D 2201/0202* (2013.01)

(58) Field of Classification Search
CPC ..... E01C 23/088; B60G 3/01; B60G 2300/09; B60G 17/0165; B60G 17/01908; G05D 1/0891; G05D 2201/0202
See application file for complete search history.

(56) References Cited

U.S. PATENT DOCUMENTS

| | | | | |
|---|---|---|---|---|
| 4,325,580 A | * | 4/1982 | Swisher, Jr. ........... | B28D 1/186 299/39.8 |
| 5,318,378 A | * | 6/1994 | Lent ...................... | E01C 23/088 404/75 |
| 9,605,393 B2 | | 3/2017 | Schlenker et al. | |
| 9,631,329 B2 | | 4/2017 | Fritz et al. | |
| 9,956,842 B2 | | 5/2018 | Muir et al. | |
| 2003/0194273 A1 | * | 10/2003 | Lloyd ................... | E01C 23/065 404/83 |
| 2007/0098494 A1 | | 5/2007 | Mares | |
| 2013/0162003 A1 | * | 6/2013 | Killion .................. | E01C 23/127 299/1.5 |

(Continued)

OTHER PUBLICATIONS

"U.S. Appl. No. 16/399,340, Response filed Sep. 22, 2020 to Non Final Office Action dated Jun. 25, 2020", 22 pgs.

*Primary Examiner* — Geepy Pe
*Assistant Examiner* — Kyle J Kingsland
(74) *Attorney, Agent, or Firm* — Schwegman, Lundberg & Woessner; Jeff A. Greene (57) ABSTRACT

A road work machine comprises a frame, a plurality of ground engaging units, a plurality of vertically moveable legs connecting the plurality of ground engaging units to the frame, respectively, a hydraulic system to control heights of the plurality of vertically moveable legs, pressure sensors for sensing hydraulic pressures in the plurality of vertically movable legs, and a controller configured to, in response to signals received from the pressure sensors, generate a control signal. A method for ride control can comprise adjusting an attitude of the machine in response to sensed pressures.

19 Claims, 5 Drawing Sheets

(56) References Cited

U.S. PATENT DOCUMENTS

| | | | |
|---|---|---|---|
| 2013/0166155 A1* | 6/2013 | Killion | E01C 23/088 |
| | | | 701/50 |
| 2016/0326701 A1 | 11/2016 | Schlenker et al. | |
| 2017/0100981 A1* | 4/2017 | Muir | E01C 23/088 |
| 2017/0327148 A1 | 11/2017 | Held et al. | |
| 2017/0362784 A1* | 12/2017 | Hoffmann | E01C 23/088 |
| 2019/0063010 A1* | 2/2019 | Hogan | B62D 55/116 |
| 2019/0136468 A1* | 5/2019 | Avans | G01L 1/2225 |

* cited by examiner

CONSTRUCTION MACHINE RIDE CONTROL SYSTEMS AND METHODS USING ELEVATION CYLINDER CONTROL

TECHNICAL FIELD

The present application relates generally, but not by way of limitation, to ride control systems and methods for construction machines, such as cold planer machines and rotary mixer machines that can be used to remove or recycle paved surfaces. More particularly, the present application relates to control systems used to adjust movement of multi-legged propulsors for such machines.

BACKGROUND

Cold planer machines can be used to remove old or degraded pavement from surfaces such as roadways and parking lots. Rotary mixers can be used to recycle old or degraded pavement for reuse on the surfaces. The surfaces can extend over uneven terrain. As such, these machines can include systems for adjusting the vertical height of the machine and a rotary cutting tool attached thereto in order to, for example, control the cutting depth during milling operations and provide a smooth ride for the operator during transport operations.

U.S. Pat. No. 9,956,842 to Muir et al., entitled "System and Method for Controlling Stability of Milling Machines" and Publication No. US 2007/0098494 to Mares disclose construction machines for roadwork.

SUMMARY OF THE INVENTION

A machine for road work can comprise a frame, a plurality of ground engaging units, a plurality of vertically moveable legs, each leg connecting one of the plurality of ground engaging units to the frame, a hydraulic system to control a height of each of the plurality of vertically moveable legs, a pressure sensor for sensing hydraulic pressure in at least one of the plurality of vertically movable legs, and a controller configured to, in response to a signal received from the pressure sensor, generate a control signal.

A method for ride control of a construction machine having a propulsion system including multiple independent propulsors each mounted to a hydraulic lifting device can comprise traversing a ground surface having a changing topography with the multiple independent propulsors, sensing a change in hydraulic pressure in one or more of the hydraulic lifting devices in reaction to the changing topography, generating a pressure signal corresponding to the sensed change in hydraulic pressure, and outputting a response by a controller of the construction machine from which a status of the construction machine can be determined.

DETAILED DESCRIPTION

Figure 1:
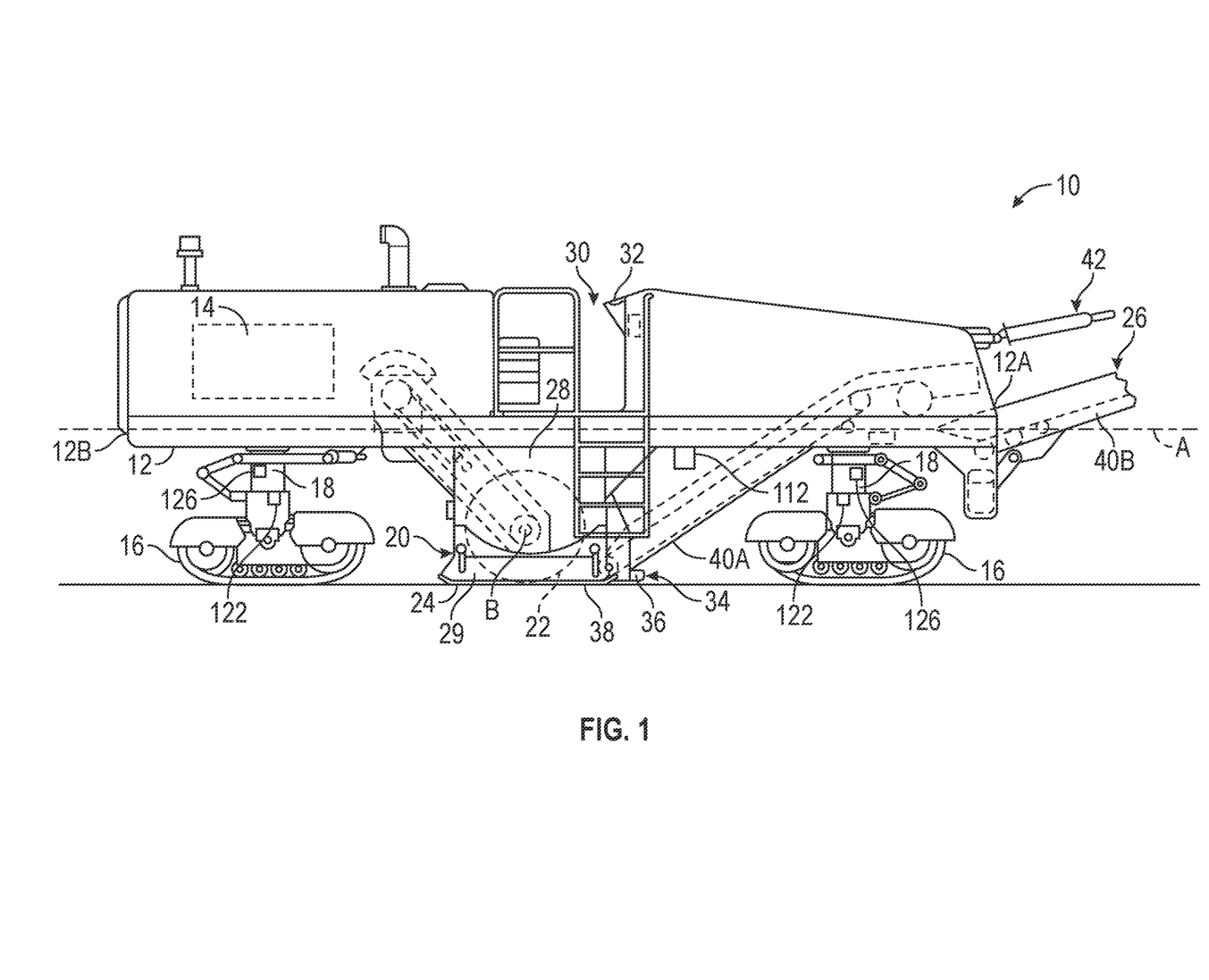
FIG. 1 is a schematic side view of a cold planer machine showing a milling system, an anti-slabbing system, a conveyor system and a plurality of transportation devices mounted to lifting columns.

FIG. 1 is a schematic side view of cold planer machine 10 showing frame 12 to which power source 14 and transportation devices (propulsors) 16 can be connected. Transportation devices 16 can be connected to frame 12 via lifting columns 18. Milling assembly 20 can, for example, be coupled to the underside of frame 12 between transportation devices 16. Although the present application is described with reference to a cold planer machine including a milling drum and conveyors, the present invention is applicable to other types of machines mounted on individually articulatable propulsion devices, such as rotary mixing machines.

Frame 12 can longitudinally extend between first end 12A and second end 12B along frame axis A. Power source 14 can be provided in any number of different forms including, but not limited to, internal combustion engines, Otto and Diesel cycle internal combustion engines, electric motors, hybrid engines and the like. Power from power source 14 can be transmitted to various components and systems of machine 10, such as transportation devices 16 and milling assembly 20.

Frame 12 can be supported by transportation devices 16 via lifting columns 18. Transportation devices 16 can be any kind of ground-engaging device that allows cold planer machine 10 to move over a ground surface, for example a paved road or a ground already processed by cold planer machine 10. For example, in the illustrated example, transportation devices 16 are configured as track assemblies or crawlers. However, in other examples, transportation devices 16 can be configured as wheels, such as inflatable tires. Transportation devices 16 can be configured to move cold planer machine 10 in forward and backward directions along the ground surface in the direction of axis A. Lifting columns 18 can be configured to raise and lower frame 12 relative to transportation devices 16 and the ground. Lifting columns 18 can be configured to rotate to provide steering for cold planer machine 10.

Figure 2:
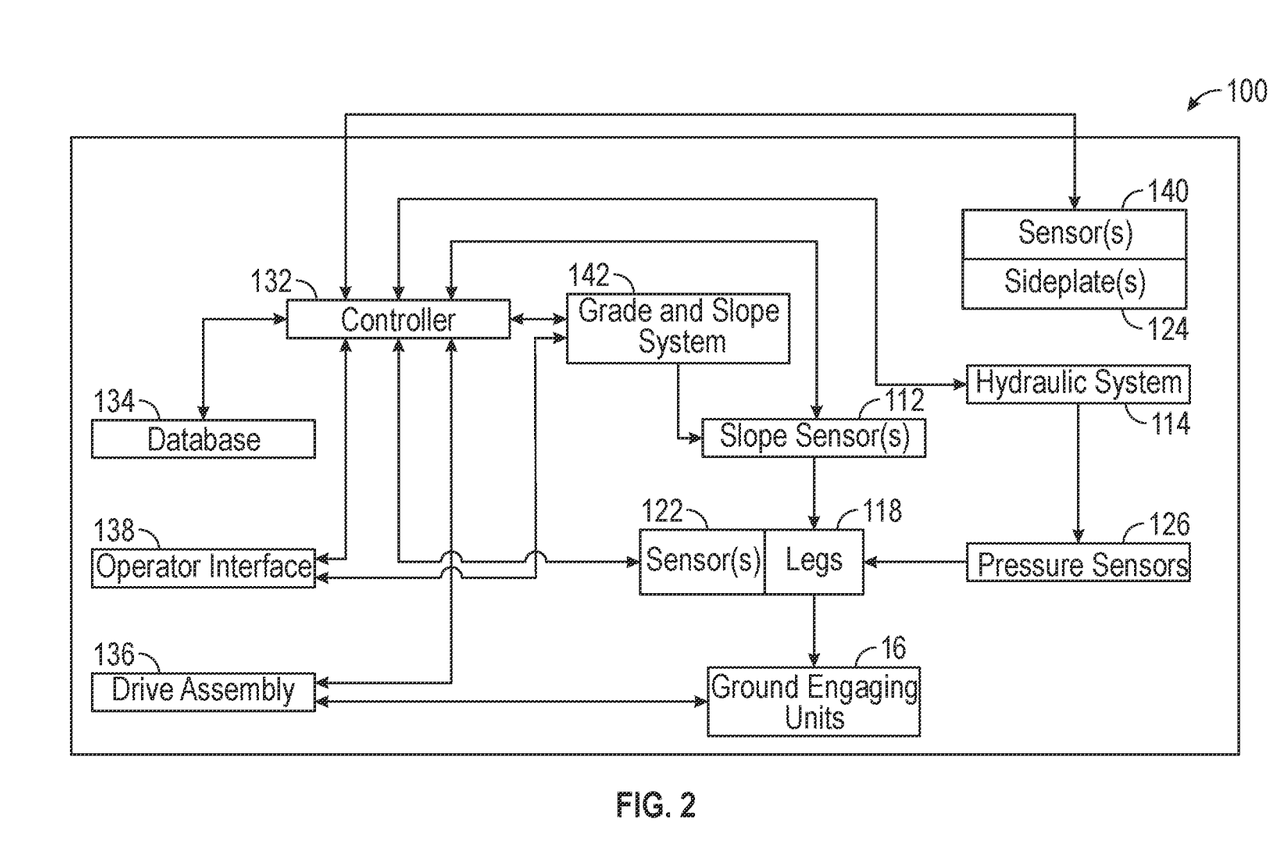
FIG. 2 is a schematic diagram of a control system for the cold planer machine of FIG. 1 illustrating a controller in communication with lifting column position and pressure sensors and a slope sensor.
Figure 3:
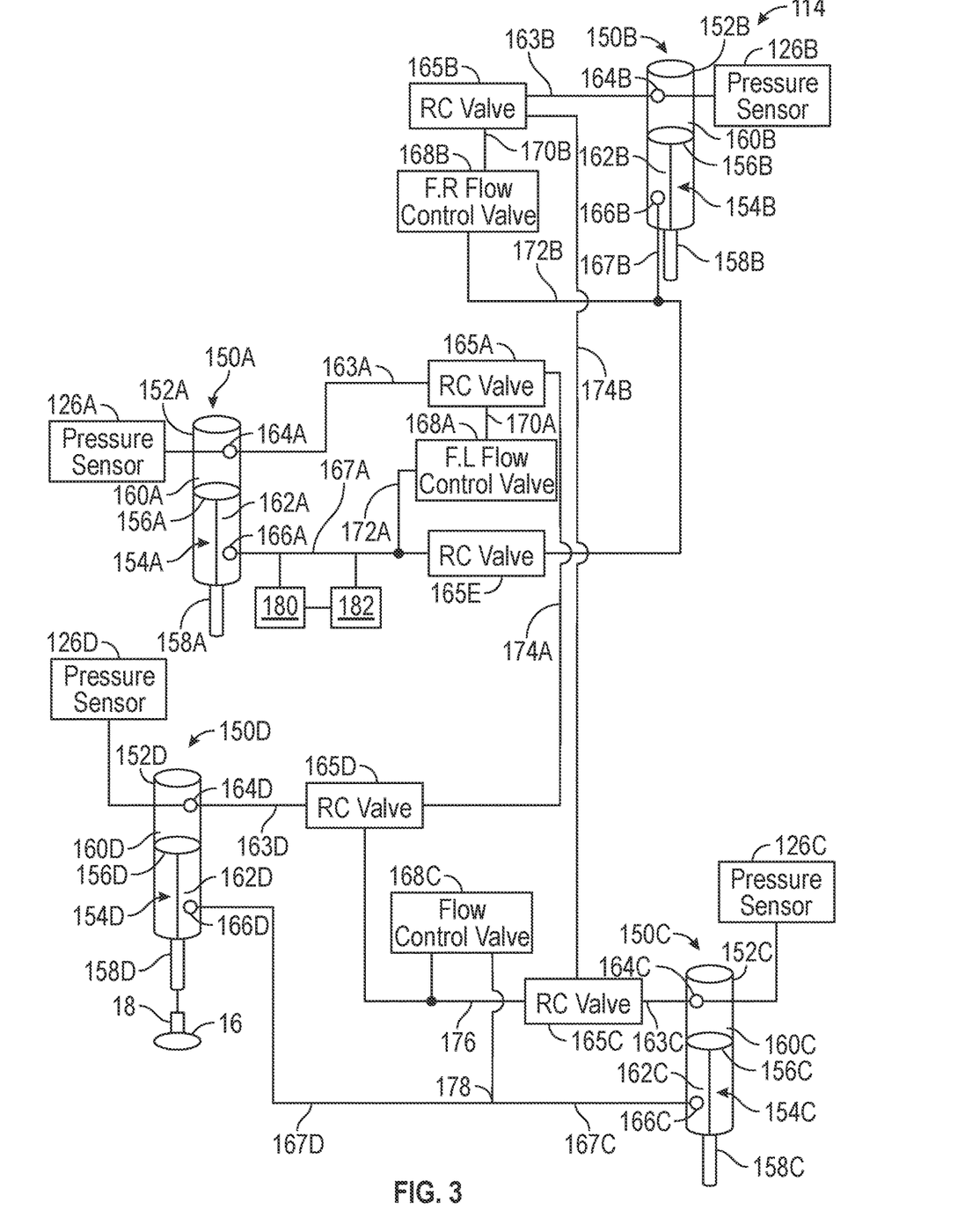
FIG. 3 is a schematic diagram of a hydraulic system for the lifting columns of the cold planer machine of FIGS. 1 and 2 including a plurality of hydraulic lifting cylinders and a plurality of hydraulic pressure sensors.
Figure 4:
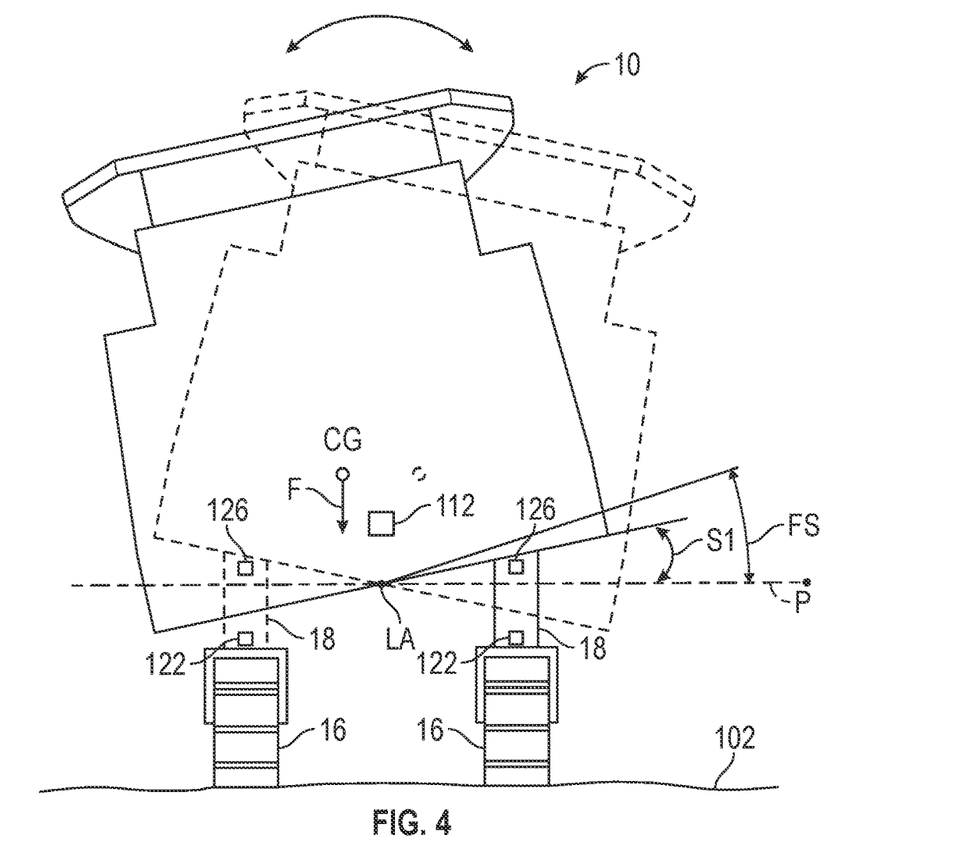
FIG. 4 is a schematic illustration showing rotation of the cold planer machine of FIG. 1 about a longitudinal axis.

Cold planer machine 10 can comprise four transportation devices 16: a front left transportation device, a front right transportation device, a rear left transportation device and a rear right transportation device, each of which can be connected to one of lifting columns 18. That is, two additional transportation devices 16 can be provided aligned with the two propulsion devices 16 shown in FIG. 1 further into the plane of FIG. 1, as can be seen in FIGS. 3 and 4. Although, the present disclosure is not limited to any particular number of propulsion devices. Lifting columns 18 can be provided to raise and lower frame 12 to, for example, control a cutting depth of milling drum 22 and to accommodate cold planer machine 10 engaging obstacles on the ground. As described herein, lifting columns 18 can be coupled to a hydraulic system, such as hydraulic system 114 of FIG. 3, that can be operated by controller 132 receiving feedback from hydraulic pressure sensors 126, slope sensor 112, position sensors 122 or combinations thereof, as illustrated in FIGS. 2-4.

Cold planer machine 10 can further include milling assembly 20 connected to frame 12. Milling assembly 20 can comprise rotatable milling drum 22 operatively connected to power source 14. Milling drum 22 can include a plurality of cutting tools, such as chisels, disposed thereon. Milling drum 22 can be rotated about a drum or housing axis B extending in a direction perpendicular to frame axis A into the plane of FIG. 1. As rotatable milling drum 22 spins or rotates about drum axis B, the cutting tools may engage work surface 24, such as, for example, asphalt and concrete, of existing roadways, bridges, parking lots and the like. Moreover, as the cutting tools engage such work surface 24, the cutting tools remove layers of materials forming work surface, such as hardened dirt, rock or pavement. The spinning action of rotatable drum 22 and the cutting tools then transfers the material of work surface 24 to conveyor system 26.

Milling assembly 20 can further comprise drum housing 28 forming a chamber for accommodating milling drum 22. Drum housing 28 can include front and rear walls, and a top cover positioned above milling drum 22. Furthermore, drum housing 28 can include lateral covers, or sideplates 29 (see sideplates 124 of FIG. 2), on the left and right sides of milling drum 22 with respect to a travel direction of cold planer machine 10. Drum housing 28 can be open toward the ground so that milling drum 22 can engage the ground from drum housing 28. Furthermore, drum housing 28 can be removed from frame 12 for maintenance, repair and transport.

In embodiments applicable to rotary mixers, drum housing 28 can be configured to contain milling drum 22 and form a mixing chamber. As such, milling drum 22 can be configured to contact a work surface during travel of the machine to reclaim and/or pulverize the work surface, such as by mixing reclaimed soil or paving material with various additives or aggregates deposited on the work surface. Thus, a rotary mixing machine of the present application can include systems for depositing an additive, such as Portland cement, lime, fly ash, cement kiln dust, etc., on the work surfaces during the reclaiming or pulverizing operations.

Figure 6:
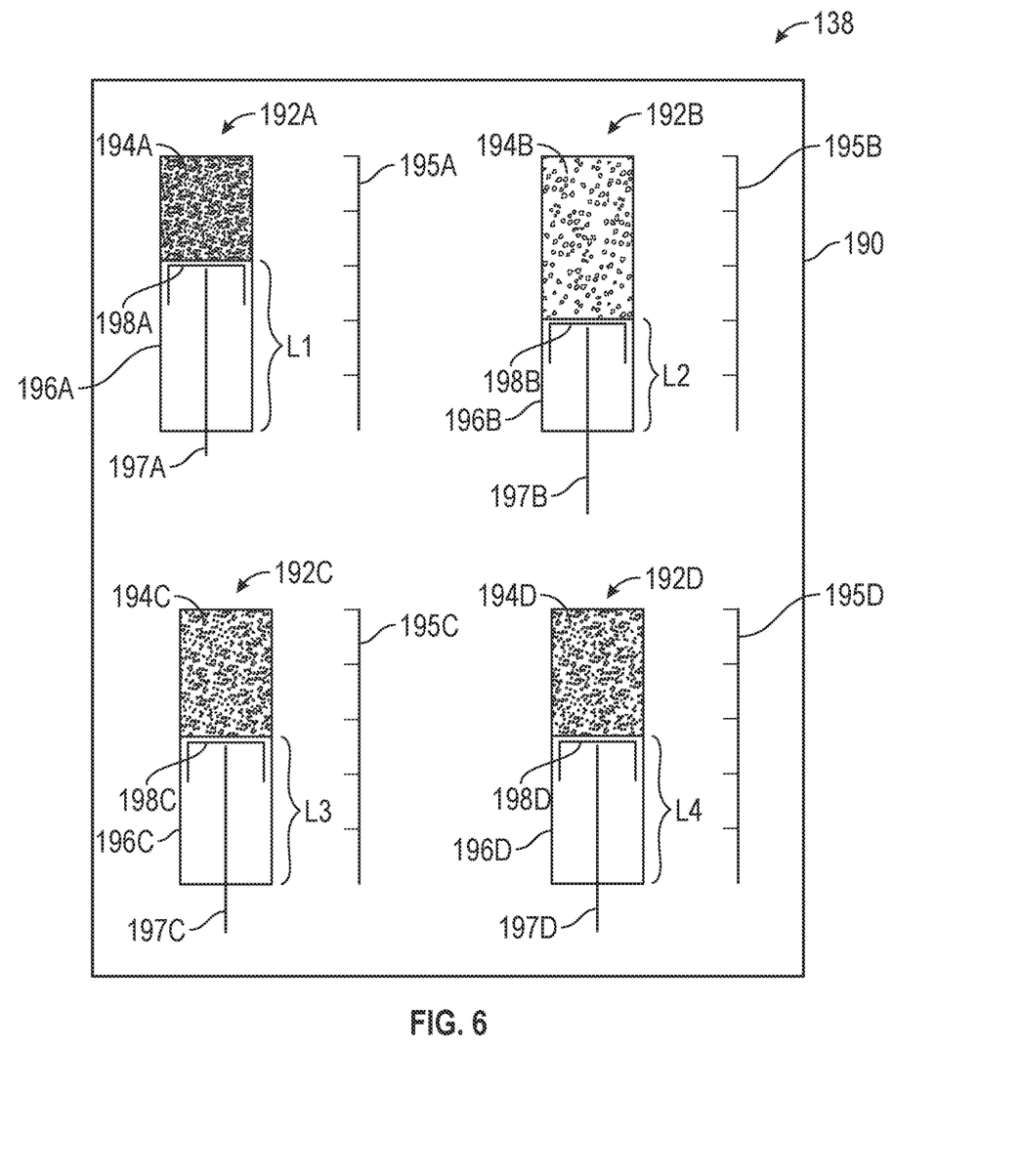
FIG. 6 is a schematic illustration of an operator control panel displaying pressure and position status of a plurality of hydraulic lifting cylinders.

Cold planer machine 10 can further include operator station or platform 30 including control panel 32 for inputting commands to control system 100 (FIG. 2) for controlling cold planer machine 10, and for outputting information related to an operation of cold planer machine 10. As such, an operator of cold planer machine 10 can perform control and monitoring functions of cold planer machine 10 from platform 30, such as by observing various data output by sensors located on cold planer machine 10, such as hydraulic pressure sensors 126, slope sensor 112 and position sensors 122. For example, FIG. 6 illustrates an example screen of control panel 190 that can be configured to show hydraulic cylinder pressure and hydraulic piston position of actuators for lifting columns 18. Furthermore, control panel 32 can include controls for operating transportation devices 16 and a hydraulic system, such as hydraulic system 114 of FIG. 3, associated with lifting columns 18.

Anti-slabbing system 34 can be coupled to drum housing 28 and can include an upwardly oriented base plate (not visible in FIG. 1) extending across a front side of the cutting chamber, a forwardly projecting plow 36 for pushing loose material lying upon work surface 24, and a plurality of skids 38.

Conveyor system 26 can comprise primary conveyor 40A and secondary conveyor 40B. Primary conveyor 40A can be positioned forward of milling drum 22 and can be coupled to and supported upon the base plate of anti-slabbing system 34. Primary conveyor 40A can feed material cut from work surface 24 via milling drum 22 to secondary conveyor 40B projecting forward of frame end 12A. Positioning mechanism 42 can be coupled to secondary conveyor 40B, to enable left, right, up and down position control of secondary conveyor 40B. Secondary conveyor 40B can deposit removed work surface 24 into a receptacle, such as the box of a dump truck. In other construction machines, such as rotary mixer embodiments, conveyors 40A and 40B can be omitted.

Cold planer machine 10, as well as other exemplary road construction machines such as rotary mixers, can include further components not shown in the drawings, which are not described in further detail herein. For example, cold planer machine 10 can further include a fuel tank, a cooling system, a milling fluid spray system, various kinds of circuitry, etc.

Cold planer machine 10 can drive over work surface 24 such that front transportation devices 16 roll over work surface 24. Cold planer machine 10 can be configured to remove work surface 24 from a roadway to leave a planed surface behind. Rear transportation devices 16 can roll on the planed surface, with milling assembly 20 producing an edge of the material of work surface 24 between milled and un-milled surfaces of work surface 24. The milled surface can comprise a surface from which paving material has been completely removed or a surface of paving material from which an upper-most layer of paving material has been removed, or a surface comprising material mixed by milling assembly 20.

Cold planer machine 10 can be configured to travel in a forward direction (from left to right with reference to FIG. 1) to remove work surface 24. Anti-slabbing system 34 can travel over the top of work surface 24 to prevent or inhibit work surface 24 from becoming prematurely dislodged during operations for removal of work surface 24. Milling drum 22 can follow behind anti-slabbing system 34 to engage work surface 24. Milling drum 22 can be configured to rotate counter-clockwise with reference to FIG. 1 such that material of work surface 24 can be uplifted and broken up into small pieces by cutting teeth or chisels of milling drum 22. Anti-slabbing system 34 can be configured to contain pieces of work surface 24 within drum housing 28. Removed pieces of work surface 24 can be pushed up primary conveyor 40A and carried forward, such as by an endless belt, to secondary conveyor 40B. Secondary conveyor 40B can be cantilevered forward of front frame end 12A to be positioned over a collection vessel, such as the box of a dump truck.

During the course of moving over work surface 24, either with milling drum 22 engaging work surface 24 in an operating mode or with milling drum 22 retracted to a transport mode, transportation devices 16 can encounter obstacles, such as depressions or protrusions, which are rolled over by transportation devices 16. Such obstacles can cause rods or pistons of lifting columns 18 to be pushed inward into a cylinder of lifting columns 18 or to extend further outward from the cylinder. Sometimes, these movements can be jarring to an operator of cold planer machine 10, such as those disposed in operator platform 30, or can potentially interfere with a cut being produced by milling drum 22. In a transport mode, where milling drum 22 is raised from work surface 24 and cold planer machine 10 is being driven at a higher speed to a different location to perform milling or to be loaded onto a truck for transportation, these movements can be particularly jarring.

The present application is directed to systems and methods for monitoring and controlling movements of lifting columns 18 to, for example, reduce operator discomfort by reducing jarring or sudden movements of lifting columns 18, maintain orientation of frame 12, and maintain desired cut characteristics. In particular examples, output from pressure sensors 126, alone or in combination with output from slope sensor 112, which can be used to monitor cutting of milling drum 22, and/or position sensors 122, which can be used to determine the length of lifting columns 18, can be used to maintain or alter orientation of frame 12 and cold planer machine 10 either by operator interaction or operation of a system controller.

FIG. 2 is an illustration of control system 100 for cold planer machine 10. Control of cold planer machine 10 can be managed by one or more embedded or integrated controllers 132 of cold planer machine 10. Controller 132 can comprise one or more processors, microprocessors, microcontrollers, electronic control modules (ECMs), electronic control units (ECUs), or any other suitable means for electronically controlling functionality of the cold planer machine 10.

Controller 132 can be configured to operate according to a predetermined algorithm or set of instructions for controlling cold planer machine 10 based on various operating conditions of cold planer machine 10 based on, for example, output of pressure sensors 126, position sensors 122 and slope sensor 112. Such an algorithm or set of instructions can be stored in database 134 and can be read into an on-board memory of controller 132, or preprogrammed onto a storage medium or memory accessible by controller 132, for example, in the form of a floppy disk, hard drive, optical medium, random access memory (RAM), read-only memory (ROM), or any other suitable computer readable storage medium commonly used in the art (each referred to as a "database").

Controller 132 can be in electrical communication or connected to drive assembly 136, or the like, and various other components, systems or sub-systems of cold planer machine 10. Drive assembly 136 can comprise an engine or hydraulic motor among other elements (such as power source 14 of FIG. 1). By way of such connection, controller 132 can receive data pertaining to the current operating parameters of cold planer machine 10 from sensors, such as pressure sensors 126, slope sensor 112 and position sensors 122, and the like. In response to such input, controller 132 may perform various determinations and transmit output signals corresponding to the results of such determinations or corresponding to actions that need to be performed, such as for producing forward and rearward movement using ground engaging units (such as transportation devices 16 of FIG. 1) or producing up and down movements of lifting columns 18.

Controller 132, including operator interface 138, can include various output devices, such as screens, video displays, monitors and the like that can be used to display information, warnings, data, such as text, numbers, graphics, icons and the like, regarding the status of cold planer 10. Controller 132, including operator interface 138, can additionally include a plurality of input interfaces for receiving information and command signals from various switches and sensors associated with cold planer machine 10 and a plurality of output interfaces for sending control signals to various actuators associated with cold planer machine 10. Suitably programmed, controller 132 can serve many additional similar or wholly disparate functions as is well-known in the art.

With regard to input, controller 132 can receive signals or data from operator interface 138 (such as at control panel 32 of FIG. 1), pressure sensors 126, position sensors 122, sideplate sensors 140, and the like. As can be seen in the example illustrated in FIG. 2, controller 132 can receive signals from operator interface 138. Such signals received by controller 132 from operator interface 138 can include, but are not limited to, an all-leg raise signal and an all-leg lower signal. In some embodiments, front legs 118 (such as lifting columns 18 of FIG. 1) can be controlled individually directly, while rear legs 118 are controlled together indirectly based off of movements of the front legs. Controller 132 can also receive position and/or length data from each position sensor 122. As noted before, such data may include, but is not limited to, information as to the lengths L1-L4 (FIG. 6) of legs 118 or the amount of extension or retraction of the leg 118. Controller 132 can also receive data from one or more sideplate sensors 140. Such data may include, but is not limited to, information related to the vertical position of sideplate 124 (e.g., sideplate 29) and/or whether sideplate 124 is in contact with surface 102.

Controller 132 can also receive data from other controllers, grade and slope system 142 for cold planer machine 10, operator interface 138, and the like. In examples, another controller may provide information to controller 132 regarding the operational status of cold planer machine 10. In other examples, such information may be provided by grade and slope system 142, or the like, to controller 132. The operation status received may include whether cold planer machine 10 is in non-milling operational status or milling operational status (e.g., milling drum 22 is not spinning or spinning).

In examples, grade and slope system 142 may receive and process data from operator interface 138 related to the operator desired depth of the cut, the slope of the cut, and the like. Grade and slope system 142 can comprise one or more slope sensors 112. As discussed with reference to FIGS. 4 and 5, slope sensor 112 can detect rotation along longitudinal axis LA and transverse axis TA.

Controller 132 can receive data from each leg position sensor 122. As noted before, such data may include information as to the length L of a leg 118 or the amount of extension or retraction of the leg 118. Controller 132 can also receive data from the one or more sideplate sensors 140. Such data may include information related to the vertical position of sideplate 124 and/or whether sideplate 124 is in contact with surface 102.

Controller 132 can also receive data from grade and slope system 142, such as from slope sensor 112, or operator interface 138 as to the operational status of the machine. Operational status received can include whether cold planer machine 10 is in milling operational status. Controller 132 and/or grade and slope system 142 can also provide information to as to the grade (the depth of the cut) and the slope of the cut to controller 132.

Controller 132 can receive data from pressure sensors 126. Pressure sensors 126 can be used to determine a status of lifting columns 18. For example, information from pressure sensors 126 can be used determine the magnitude of impacts and on transportation devices 16 or the magnitude of depressions over which transportation devices 16 traverse. Additionally, for example, information from pressure sensors 126 can also be used to determine the position of lifting columns 18, e.g., the position of a piston relative to a cylinder housing. As such, information from pressure sensors 126 can be used to take corrective action or other control actions for cold planer machine 12. For example, controller 132 can be employed to react to readings from pressure sensors 126 and adjust the orientation of frame 12, such as by changing the position of one or more lifting columns 18, or an operator of cold planer machine 10 can observer visual, audible or other warning information or indicia on operator interface 138 to manually adjust the position of lifting columns 18.

FIG. 3 is a schematic illustration of hydraulic system 114 for lifting columns 18 of cold planer machine 10 including a plurality of hydraulic pressure sensors 126. Hydraulic system 114 can comprise hydraulic cylinders 150A, 150B, 150C and 150D.

Hydraulic cylinders 150A-150D can include housings 152A-152D and piston assemblies 154A-154D, respectively, located slidably therein. Each of housings 152A-152D can include a hollow bored interior, and each piston assemblies 154A-154D can include cylinder pistons 156A-156D, respectively, configured to fit closely within the bore, and a piston rods 158A-158D operatively connected to cylinder pistons 156A-156D. Piston assemblies 154A-154D can divide their respective cylinder housings 152A-152D into upper chambers, or bore ends, 160A-160D and lower chambers, or rod ends, 162A-162D. Upper chambers 160A-160D can include outlets 164A-164D that can direct the pressurized hydraulic fluid out of upper chambers 160A-160D and into ride control valves 165A-165D via lines 163A-163D, for example. In additional examples, ride control valves 165A-165D can be mounted directly to outlets 164A-164D, respectively. Lower chambers 162A-162D can include outlets 166A-166D to allow the pressurized hydraulic fluid to connect with flow control valves 168A-168C and ride control valve 165E via lines 167A-167D, for example.

Upper chamber 160A of hydraulic cylinder 150A can be connected to upper chamber 160B of hydraulic cylinder 150B via outlet 164A, line 163A, ride control valve 165A, fluid line 170A, flow control valve 168A, fluid line 172A (including a portion of line 167A), ride control valve 165E, fluid line 172B (including a portion of line 167B), flow control valve 168B, fluid line 170B, ride control valve 165B, line 163B and outlet 164B.

Upper chamber 160B of hydraulic cylinder 150B can be connected to upper chamber 160C of hydraulic cylinder 150C via outlet 164B, line 163B, ride control valve 165B, fluid line 174B, ride control valve 165C, line 163C and outlet 164C.

Upper chamber 160A of hydraulic cylinder 150A can be connected to upper chamber 160D of hydraulic cylinder 150D via outlet 164A, line 163A, ride control valve 165A, fluid line 174A, ride control valve 165D, line 163D and outlet 164D.

Upper chamber 160C of hydraulic cylinder 150C can be connected to upper chamber 160D of hydraulic cylinder 150D via outlet 164C, line 163C, ride control valve 165C, fluid line 176, ride control valve 165D, line 163D and outlet 164D.

Lower chamber 162A of hydraulic cylinder 150A can be connected to lower chamber 162B of hydraulic cylinder 150B via outlet 166A, line 167A, ride control valve 165E, line 167B and outlet 166B.

Lower chamber 162C of hydraulic cylinder 150C can be connected to lower chamber 162D of hydraulic cylinder 150D via outlet 166A, line 167C, line 167D, which can be joined at junction 178, and outlet 166C.

As is illustrated with reference to hydraulic cylinder 150D, each of piston rods 158A-158D can be connected to a lifting column 18 and a transportation device 16. Additionally, as is illustrated with reference to hydraulic cylinder 150A, hydraulic system 114 can include pump 180 and reservoir 182, which can be configured to pressurize or cause flow within system 114 throughout. As such, pump 180 and reservoir 182 can be connected to fluid lines of hydraulic system 114 at additional locations to produce flow to either side of cylinder pistons 156A-156D.

Flow control valves 168A-168C can be configured as open/close valves meaning that flow can be alternately permitted or prevented therethrough, depending on at what state they are set.

Flow control valves 168A-168C can be configured to route hydraulic fluid from one of hydraulic cylinders 150A-150D to another, or from one side of cylinder pistons 156A-156D, respectively, in order to control the height or length of a lifting column 18. Flow control valve 168A can route hydraulic fluid between upper chamber 160A and lower chamber 162A, and flow control valve 168B can route hydraulic fluid between upper chamber 160B and 162B. Flow control valve 168C can route hydraulic fluid between upper chambers 160C and 160D and lower chambers 162C and 162D. The individual heights of lifting columns 18 at hydraulic cylinders 150A and 150B can be controlled individually, while the individual heights of lifting columns 18 at hydraulic cylinders 150C and 150D can be controlled collectively, such as based on the individual heights of hydraulic cylinders 150A and 150B. As such, flow control valves 168A-168C can be controlled by an operator, such as via controller 132, to, for example, control the depth of a cut or the slope of a cut. Flow control valves 168A-168C can additionally be automatically controlled by controller 132 to adjust the length of lifting columns 18.

Ride control valves 165A-165D can be configured as alternate flow valves meaning that flow can be alternately routed therethrough to different fluid lines, depending on at what state they are set. Ride control valve 165E can be configured as an open/close valve meaning that flow can be alternately permitted or prevented therethrough, depending on at what state it is set.

Ride control valves 165A-165E can be configured to be selectively activated by an operator of cold planer machine 10. When a "ride control" setting is set to an "off" condition, such as at operator interface 138, ride control valves 165A-165E can be actuated to a position where flow of hydraulic fluid is routed through flow control valves 168A-168C. Thus, operation of flow control valves 168A-168C controls flow of hydraulic fluid through hydraulic system 114, as discussed above. When a "ride control" setting is set to an "on" condition, such as at operator interface 138, ride control valves 165A-165E can be actuated to a position where flow of hydraulic fluid is routed away from flow control valves 168A-168C. Thus, operation of ride control valves 165A-165E controls flow of hydraulic fluid through hydraulic system 114.

With ride control valves 165A-165C active to a "ride control" state, upper chambers 160A and 160D of hydraulic cylinders 150A and 150D can be connected via line 174A, and upper chambers 160B and 160D of hydraulic cylinders 150B and 150D can be connected via line 174B. Also, lower chambers 162A and 162B can be coupled by ride control valve 165E, and lower chambers 162C and 162 can be coupled by line 166C. Thus, flow of hydraulic fluid through hydraulic system 114 can be controlled by the individual pressure applied to each of piston rods 158A-158D through lifting columns 18 and transportation devices 16.

In examples, hydraulic system 114 can be configured according to the disclosure of Pub. No. US 2007/0098494 A1 to Mares, which is hereby incorporated in its entirety by this reference.

Pressure sensors 126A-126D can be coupled to hydraulic cylinders 150A-150D to sense hydraulic pressures therein, respectively. Only one pressure sensor 126 can be used per hydraulic cylinder 150A-150D. However, in other examples, additional pressure sensors can be used to sense pressure at various locations throughout hydraulic system 114. In examples, pressure sensors 126A-126D can be fluidly coupled to upper chambers 160A-160D to sense the pressures between cylinder pistons 156A-156D and the closed, upper (as depicted) ends of housings 152A-152D, respectively. In examples, pressure sensors 126A-126D can be coupled to lines 163A-163D between outlets 164A-164D and ride control valves 165A-165D, respectively. Pressure sensors 126A-12D can be configured as any suitable device, such as piezoresistive strain gauges, capacitive sensors, electromagnetic sensors, piezoelectric sensors, strain-gauge sensors and others.

System 100 can be configured to adjust the position and orientation of frame 12 based on input from one or a combination of various sensors of cold planer machine 10, such as hydraulic pressure sensors 126, position sensors 122 and slope sensor 112. In particular, controller 132 can be, in various examples, configured to detect pressure change in hydraulic cylinders 150A-150D coupled to or comprising each of lifting columns 18 associated with a change in topography of the surface over which cold planer machine 10 is traversing, such as surface 24. For example, as one of transportation devices 16 engages a protrusion in surface 24 or a depression in surface 24, an associated pressure spike or pressure drop, respectively, can occur with the associated hydraulic cylinder 150A-150D. Controller 132 can, in response to a sudden pressure change at one lifting column 18 cause one or more other lifting columns 18 to change height, such as by inducing a pressure change in one of more of hydraulic cylinders 150A-150D, to return frame 12 to a desired orientation. Additionally, an operator of cold planer machine 10 can manually receive information from controller 132, such as via operator interface 138, and manually adjust the height of lifting columns 18.

System 100 can include slope sensor 112 disposed on frame 12. In examples, slope sensor 112 can be positioned near the longitudinal and lateral center of frame 12. Slope sensor 112 can be configured to generate a signal indicative of the slope of cold planer machine 10. The slope of cold planer machine 10 can be defined with respect to a movement of frame 12 about longitudinal axis LA (FIG. 4), which can be coincident with axis A of FIG. 1, extending in a direction of travel of machine 10, and transverse axis TA (FIG. 5) extending left-to-right across machine 10 perpendicular to longitudinal axis LA. The slope of cold planer machine 10 can be defined with respect to a movement of cold planer machine 10 and with respect to a horizontal plane P perpendicular to a direction of a gravitational force F of cold planer machine 10. The gravitational force F may correspond to a force caused by a weight of cold planer machine 10 at a center of gravity CG thereof towards the ground surface 102 (such as the top of work surface 24 of FIG. 1). The horizontal plane P is hereinafter referred to as the reference plane P.

In the illustrated example, slope sensor 112 is located on frame 12 between the front and rear transportation devices 16, as shown in FIG. 1. Slope sensor 112 can additionally be located between left and right transportation devices 16. In additional examples, slope sensor 112 can be disposed on frame 12 around an intersecting location defined by longitudinal axis LA and the transverse axis TA of cold planer machine 10. In other examples, slope sensor 112 can be disposed at any location in frame 12 to generate the signal indicative of the slope of cold planer machine 10. In yet additional examples, a plurality of slope sensors 112 can be disposed at various locations in or on frame 12 of cold planer machine 10.

In examples, slope sensor 112 can comprise a dual-axis sensor for sensing movement along transverse axis TA and longitudinal axis LA. In additional examples, slope sensor 112 can include a gyro sensor. The gyro sensor may be configured to generate signals indicative of rotational attributes of cold planer machine 10, such as a pitch and a roll, as cold planer machine 10 traverses over terrain having varying topographical features such as bumps, hills, protrusions, obstacles, depressions, pot holes and the like, thereby causing a change or orientation of frame 12 about axes TA and LA. The pitch may correspond to the movement of cold planer machine 10 about the transverse axis TA and the roll may correspond to the movement of cold planer machine 10 about the longitudinal axis LA. In various examples, slope sensor 112 can include a sensor device, an angle measurement device, a force balancing member, a solid state member, a fluid filled device, an accelerometer, a tilt switch or any other device that can determine the slope of cold planer machine 10 with respect to one or more of the various reference parameters including, but not limited to, the reference plane P and the ground surface 102, a the longitudinal axis LA and the transverse axis TA of cold planer machine 10, Controller 132 can be in communication with slope sensor 112, position sensors 122 and pressure sensors 126. Controller 132 can be configured to receive a signal indicative of the slope of cold planer machine 10 about the longitudinal axis LA and the transverse axis TA thereof generated by slope sensor 112. Controller 132 can be configured to receive signals indicative of pressure in hydraulic cylinders 150A-150D generated by pressure sensors 126A-126D. Controller 132 can be configured to receive signals indicative of the positions of piston rods 158A-158D relative to housings 152A-152D, respectively generated by position sensors 122. Controller 132 can be disposed at control panel 32, but can be disposed on any location on frame 12.

Controller 132 can further be configured to be in communication with hydraulic system 114 controlling operation and position of lifting columns 18. In examples, hydraulic system 114 can include a reservoir for containing a hydraulic fluid and one or more pumps to communicate pressure generated by the hydraulic fluid to lifting columns 18 and transportation devices 16. One or more direction control valves, such as ride control valves 165A-165E and flow control valves 168A-168C, can be disposed in the hydraulic system to control direction of flow of the hydraulic fluid. Furthermore, additional control valves, such as check valves, pressure relief valves, pressure regulating valves, and the like may be disposed in the hydraulic system for generating required hydraulic power for actuation of the transportation devices 16 and lifting columns 18. Controller 132 can be in communication with the one or more directional control valves and one or more additional control valves to control the flow of the hydraulic fluid to each of lifting columns 18. Thus, hydraulic system 114 in communication with controller 132 can be configured to actuate each of lifting columns 18 individually based on an input received from controller 132. Likewise, control panel 32 can include operator inputs to control hydraulic system 114 through controller 132. Additionally, hydraulic system 114 or a separate hydraulic system can be in communication with transportation devices 16 to provide hydraulic fluid for motive force for transportation devices 16 that can be additionally controlled by controller 132.

Controller 132 can be configured to determine a first slope S1 of cold planer machine 10 based on the signal received from slope sensor 112. The first slope S1 is a first angle defined by the longitudinal axis LA of cold planer machine 10. The first slope S1 is further defined with reference to the reference plane P perpendicular to the gravitational force F of cold planer machine 10. Controller 132 in communication with slope sensor 112 can receive a signal corresponding to the movement of cold planer machine 10 about the longitudinal axis LA thereof to determine the first slope S1. In various examples, controller 132 can determine the first slope S1 based on the reference parameters including the movement of cold planer machine 10 about the longitudinal axis LA, the reference plane P, first predetermined slope FS of FIG. 4 and the ground surface 102.

Controller 132 can be configured to determine a second slope S2 of cold planer machine 10 based on the signal received from slope sensor 112. The second slope S2 is a first angle defined by the transverse axis TA of cold planer machine 10. The second slope S2 is further defined with reference to the reference plane P perpendicular to the gravitational force F of cold planer machine 10. Controller 132 in communication with slope sensor 112 can receive a signal corresponding to the movement of cold planer machine 10 about the transverse axis TA thereof to determine the second slope S2. In various examples, controller 132 can determine the second slope S2 based on the reference parameters including the movement of cold planer machine 10 about the transverse axis TA, the reference plane P, second predetermined slope SS of FIG. 5 and the ground surface 102.

Using input from one or more of pressure sensors 126A-126D, position sensors 122 and slope sensor 112, controller 132 can be configured to adjust the position of lifting columns 18 to adjust first slope S1 and second slope S2 in order to maintain a desired orientation or attitude of frame 12 and cold planer machine 10. A desired orientation or attitude for frame 12 and cold planer machine 10 can be entered at operator interface 138 and stored in database 134 or a memory module of controller 132. As such, data from one or more of pressure sensors 126A-126D, position sensors 122 and slope sensor 112 can be used to verify or confirm data from the others of pressure sensors 126A-126D, position sensors 122 and slope sensor 112, either before or after action is taken. For example, orientation of frame 12 can be read from slope sensor 112 and compared with an operator-input orientation. Then, information from position sensors 122 can be used to adjust the position of lifting columns 18 to bring frame 12 back into, or within a tolerance band of, the operator-input orientation. Information from pressure sensors 126 can be compared with information from position sensors 122 to verify correct and accurate operation of lifting columns 18. In other examples, information from position sensors 122 can be used to verify information from pressure sensors 126. In yet other examples, information from pressure sensors 126 and position sensors 122 can be compared to orientation information from slope sensor 112 to verify orientation of frame 12 or operation of lifting cylinders 18.

Controller 132 can be configured to actuate at least one of the lifting columns 18 to raise or lower at least one of transportation devices 16. Controller 132 can communicate with hydraulic system 114 to extend or retract at least one of lifting columns 18 to adjust first slope S1 and second slope S2. The selected legs to be actuated may be referred to as the actuatable leg(s). Controller 132 can actuate at least one of the lifting columns 18 until the first slope S1 and the second slope are returned to the desired slope. Additionally, or alternatively, controller 132 can be configured to communicate with hydraulic system 114 to extend or retract at least one of lifting columns 18 to adjust pressures within upper chambers 160A-160D of hydraulic cylinders 150A-150D, as illustrated by chambers 194A-194D (FIG. 6), using input from pressure sensors 126A-126D.

The position of each of the lifting columns 18 can correspond to a position between the maximum extended position and the maximum retracted position thereof. Each of the lifting columns 18 can be at various positions based on the slope of cold planer machine 10, such as is set by the operator at operator interface 138. In examples, one or more of the lifting columns 18 may be at the extended position or the retracted position, or between the extended position and the retracted position. Controller 132 can determine the positions of lifting columns 18 based on signal received from one or more of slope sensor 112, position sensors 122 and pressure sensors 126A-126D. Controller 132 can also communicate with hydraulic system 114 to determine the position of lifting columns 18. Controller 132 can actuate lifting columns 18 based on the positions of lifting columns 18, the first slope S1 and second slope S2 of cold planer machine 10, or pressures of chambers 194A-194D, as discussed above. In examples, if one of lifting columns 18 is in a fully extended position, then such lifting column cannot extend further to control the first slope S1 and the second slope S2. Similarly, if one of lifting columns 18 is in a fully retracted position, then such lifting column cannot retract further to control the first slope S1 and the second slope S2. Controller 132 can actuate at least one of or all of lifting columns 18 based on the positions of each of the lifting columns 18 to control the first slope S1 and the second slope S2, which additionally effects the pressures of chambers 194A-194D. Controller 132 can actuate at least one of or all of lifting columns 18 based on the pressures of chambers 194A-194D to control the first slope S1 and the second slope S2, which additionally effects the position of lifting columns 18.

Figure 5:
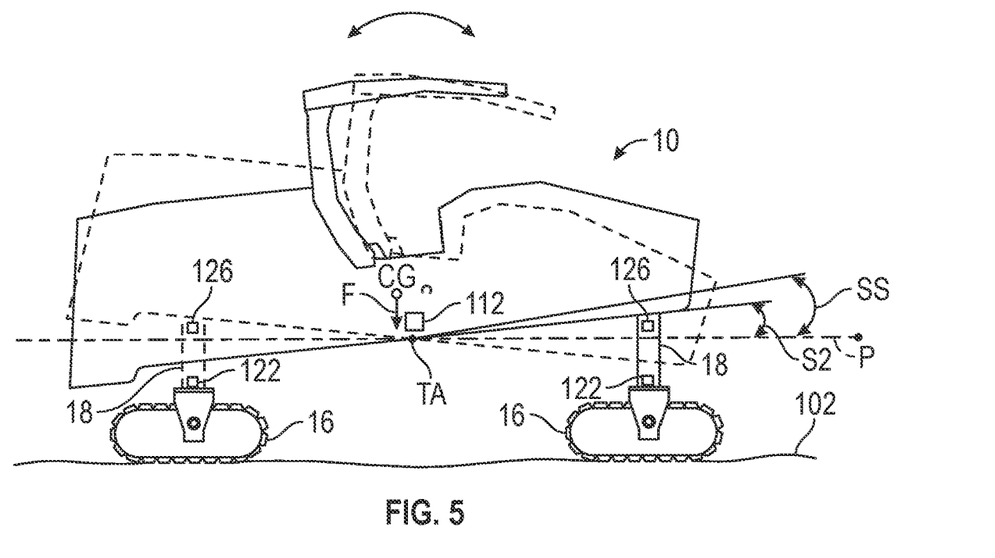
FIG. 5 is a schematic illustration showing rotation of the cold planer machine of FIG. 1 about a transverse axis.

Controller 132 can obtain slope information from slope sensor 112, pressure information from pressure sensors 126A 126D) and position information from position sensors 122 in real-time and can make real-time adjustments to the attitude of frame 12 and cold planer machine 10, via lifting columns 18, to maintain various parameters, such as a preferred or desired orientation of frame 12 or cold planer machine 10 that 1) maintains a desired cut orientation of milling drum 22 [such as within a predetermined tolerance band defined by first predetermined slope FS of FIG. 4 and second predetermined slope SS of FIG. 5 relative to horizontal], 2) provides a comfortable, smooth ride for an operator of cold planer machine 10 located at platform 30, 3) maintain the stability of cold planer machine 10 [such as within a predetermined tolerance band defined by first predetermined slope FS of FIG. 4 and second predetermined slope SS of FIG. 5 relative to horizontal], and other considerations.

Controller 132 can use information gathered from one or more of slope sensor 112, pressure sensors 126A-126D and position sensors 122 to maintain a desired cut orientation of milling drum 22 by maintaining a ground inclination of frame 12 relative to the ground. The ground inclination can thus be set so that milling drum 22 performs various functions, including creep to scratch (e.g., slow controlled lowering of the rotor to just touch the surface to be milled), obstacle jump (e.g., a height the rotor is raised to clear an obstacle), long jump (e.g., a distance the rotor is raised to clear an obstacle), synchronous leg control (e.g., operating legs simultaneously to obtain stability), grade and slope (e.g., orientation of the rotor relative to the ground), and machine ground inclination (e.g., orientation of the frame relative to the ground).

FIG. 6 is a schematic illustration of operator control panel 190 of operator interface 138 displaying the pressure and position status of a plurality of hydraulic cylinders 150A-150D. Hydraulic cylinders 150A-150D can be represented as icons 192A-192D on control panel 190 having pressure chambers 194A-194D corresponding to upper chambers 160A-160D. Each icon 192A-192D can have an associated scale 195A-195D to indicate a position of hydraulic cylinders 150A-150D. Icons 192A-192D can also include cylinders 196A-196D, piston rods 197A-197D and cylinder pistons 198A-198D, which can correspond to housings 152A-152D, piston rods 158A-158D, and cylinder pistons 156A-156D, respectively.

Control panel 190 can be used to observe and manipulate information obtained from slope sensor 112, position sensors 122 and pressure sensors 126. For example, chambers 194A-194D can alter their appearance to indicate a magnitude of pressure within upper chambers 160A-160D. For example, chambers 194A-194D can change color according to a heat map to indicate pressure, with red indicating high pressure, yellow indicating low pressure and green indicating pressure within a desirable operating band. Alternatively, chambers 194A-194D can be configured to change color density, such as with black indicating high pressure, white indicating low pressure and grey indicating pressure within a desirable operating band. For example, as illustrated, chambers 194C and 194D can be green or grey to indicate that hydraulic cylinders 150C and 150D are operating at a medium pressure level, such as within a normal operating range, chamber 194A can be red or black to indicate high pressure associated with piston rod 197A being retracted into cylinder 196A relative to piston rods 197C and 197D, and chamber 194B can be yellow or white to indicate low pressure associated with piston rod 197B being extended from cylinder 196B relative to piston rods 197C and 197D. A yellow or white status can indicate that the associated transportation device 16 has driven or is driving over a depression. A red or black status can indicate that the associated transportation device 16 has driven or is driving over a bump. Additionally, control panel 190 can be configured to include a numerical representation of the pressure within each of chambers 194A-194D.

The position of piston cylinders 198A-198D relative to cylinders 196A-196D can be used to provide a qualitative indication of the position of lifting columns 18. Scales 195A-195D can be used to provide a quantitative indication. Scales 195A-195D can include hash marks to indicate graduations of the lengths L1-L4 of piston rods 197A-197D that extend from or extend out of cylinders 196A-196D, such as a percentage value or an absolute value. Additionally, control panel 190 can be configured to include a numerical representation of the position of each of cylinder pistons 198A-198D relative to cylinders 196A-196D.

The position of cylinder pistons 198A-198D relative to cylinders 196A-196D and the pressures within chambers 194A-194D can be adjusted using control panel 190. For example, physical or electronic buttons or sliders can be included in operator interface 138. Additionally, control panel 190 can be configured as a touch screen such that piston rods 197A-197D can be dragged up or down (relative to the orientation of FIG. 6) to adjust position and pressure. Thus, by viewing control panel 190, an operator of cold planer machine 10 can view the status of cold planer machine 10 and manually take corrective or adjustive action, such as to adjust the position of lifting columns 18 to accommodate terrain changes. Additionally, an operator of cold planer machine 10 can view real-time reaction of cold planer machine 10 to the terrain over which the machine is traversing and can observe adjustments that controller 132 automatically makes in response thereto.

The status of chambers 194A-194D and the position of piston rods 197A-197D can provide a visual alarm or indication to the operator of cold planer machine 10 regarding the status of the pressures and positions. Other types of alarms, such as auditory or warnings can be provided. Control panel 190 can additionally be configured to display warnings regarding conditions of cold planer machine 10 that deviate outside of typical operating conditions. For example, a warning light or icon can be displayed on control panel 190 if the hydraulic pressure within any of chambers 194A-194D drops too much, indicating a possible leak, or increases too much, indicating that the integrity of a hydraulic cylinder may be compromised or that a pressure-relief valve has failed.

INDUSTRIAL APPLICABILITY

The present application describes various systems and methods for observing and controlling vertical movement of machines including individually mounted propulsion elements or transportation devices. The propulsion elements or transportation devices can be mounted to lifting columns, such as hydraulic cylinders, that can be controlled with a hydraulic system. For example, four hydraulic cylinders of a propulsion system can be individually operated to maintain a desired inclination, orientation or attitude of the machine. The inclination, orientation or attitude of the machine can be measured by a slope sensor mounted to a frame of the machine or another location and displayed on an operator control panel. Pressures within the hydraulic cylinders can be measured by pressure sensors mounted to a hydraulic system servicing the hydraulic cylinders and displayed on an operator control panel. The position of the hydraulic cylinders can be measured by position sensors mounted to or within the hydraulic cylinders and displayed on an operator control panel. Information or data from the slope sensor, pressure sensors and position sensors can be used in real-time or a near real-time basis to continuously observe and adjust the length of the lifting columns to maintain the desired inclination, orientation or attitude of the machine, such as automatically with a machine controller or manually using operator inputs. The desired orientation of the machine can be correlated, such as by an operator, to 1) maintain a desired cut orientation of a milling drum, 2) provide a comfortable, smooth ride for an operator of the machine located at an operator platform, 3) maintain stability of machine (e.g., to prevent rollover), and other considerations.

What is claimed is:
1. A machine for road work, the machine comprising:
a frame;
a plurality of ground engaging units;

a plurality of vertically moveable legs, each leg connecting one of the plurality of ground engaging units to the frame;
a hydraulic system to control a height of each of the plurality of vertically moveable legs;
a plurality of pressure sensors for sensing hydraulic pressure in the plurality of vertically movable legs, respectively;
a controller configured to, in response to a signal received from the pressure sensor, generate a control signal; and
a multi-axis slope sensor coupled to the frame to detect a pitch and slope of the frame, wherein the controller is configured to compare an orientation of the frame determined from the signal from the plurality of pressure sensors to an orientation of the frame determined from the multi-axis slope sensor.

2. The machine for road work of claim 1, wherein the control signal is configured to activate at least one of the plurality of vertically moveable legs.

3. The machine for road work of claim 2, wherein the controller is configured to react to changes in pitch and slope of the frame as the plurality of ground engaging units traverse terrain having a changing topography.

4. The machine for road work of claim 3, wherein the controller is configured to maintain the frame within a tolerance band of horizontal relative to gravity in response to signals from the plurality of pressure sensors.

5. The machine for road work of claim 1, wherein each of the vertically movable legs comprises a hydraulic cylinder from which a piston shaft is hydraulically extendable and one of the plurality of pressure sensors is positioned to sense pressure at a bore of a closed upper end of each of the hydraulic cylinders from which the piston shafts extend, respectively.

6. The machine for road work of claim 5, wherein each of the plurality of pressure sensors is positioned between the bore and a valve fluidly coupled to each of the bores.

7. The machine for road work of claim 1, wherein the controller is configured to activate all of the plurality of vertically moveable legs in real-time in response to the signal from the plurality of pressure sensors.

8. The machine for road work of claim 1, wherein the controller is configured to activate the at least some of the plurality of vertically moveable legs while a milling assembly mounted to the frame is in a non-operating state.

9. The machine for road work of claim 5, wherein the control signal is configured to activate an operator alarm in communication with the controller.

10. The machine for road work of claim 9, further comprising an operator control panel and the operator alarm comprises a visual indicator on the operator control panel of a magnitude of a pressure within each of the closed upper ends of the plurality of vertically moveable legs corresponding to hydraulic pressure sensed by the plurality of pressure sensors and a length of the piston shaft at a lower end of each of the hydraulic cylinders.

11. A method for ride control of a construction machine having a propulsion system including multiple independent propulsors each mounted to a hydraulic lifting device connected to a frame, the method comprising:
traversing a ground surface having a changing topography with he multiple independent propulsors;
sensing a change in hydraulic pressure in each of the hydraulic lifting devices in reaction to the changing topography;
generating a plurality of pressure signals corresponding to the sensed change in hydraulic pressures in each of the hydraulic lifting devices;
outputting a control signal by a controller of the construction machine based on the plurality of pressure signals from which a pitch and slope of the frame of the construction machine can be determined;
generating a signal from a multi-axis slope sensor connected to the frame indicative of a pitch and slope of the frame; and
comparing an orientation of the frame determined from the signal from the multi-axis slope sensor to an orientation of the frame determined from the control signal.

12. The method of claim 11, further comprising comparing the control signal with output of a slope sensor comprising a component of a grade control system.

13. The method of claim 11, wherein:
the plurality of pressure signals comprises pressures within each of the hydraulic lifting devices; and
the control signal comprises displaying a visual indication of each of the pressures on an operator panel of the construction machine.

14. The method of claim 11, wherein:
the signal from the multi-axis slope sensor comprises an attitude of the machine; and
the control signal comprises:
calculating a deviation of the attitude of the machine from a selected attitude; and
adjusting a height of the multiple independent propulsors to return the attitude of the machine to the selected attitude.

15. The method of claim 14, wherein the selected attitude comprises a predetermined orientation for an operator.

16. The method of claim 14, wherein the selected attitude comprises a stable orientation of the construction machine.

17. The method of claim 14, wherein adjusting the height of the multiple independent propulsors to return the attitude of the machine to the selected attitude occurs in real-time.

18. The method of claim 14, wherein adjusting the height of the multiple independent propulsors to return the attitude of the machine to the selected attitude occurs while a milling assembly mounted to the construction machine is in a non-operating state.

19. The method of claim 14, wherein adjusting the height of the multiple independent propulsors to return the attitude of the machine to the selected attitude comprises activating at least one of the multiple independent propulsors to move up and an opposite one of the multiple independent propulsors to move down.

\* \* \* \* \*